United States Patent [19]

Paynter

[11] 4,143,883
[45] Mar. 13, 1979

[54] PUSH-PULL CONTROL WITH SPRING-LOADED SEAL
[75] Inventor: Alan H. Paynter, Thornwood, N.Y.
[73] Assignee: Controlex Corporation of America, Croton Falls, N.Y.
[21] Appl. No.: 875,873
[22] Filed: Feb. 7, 1978
[51] Int. Cl.² ........................... F16C 1/28; F16J 15/32
[52] U.S. Cl. ..................................... 277/164; 277/205; 277/211; 74/501 R
[58] Field of Search .................. 74/501 R, 501 P, 502, 74/503; 277/138, 149, 157, 163, 164, 205, 207 R, 208–211

[56] References Cited
U.S. PATENT DOCUMENTS

| 2,997,318 | 8/1961 | Lansky et al. | 277/210 |
| 3,248,882 | 5/1966 | Roosa | 74/501 X |
| 3,653,670 | 4/1972 | Sifri et al. | 277/164 |
| 3,680,874 | 8/1972 | Schwarz | 277/205 X |

FOREIGN PATENT DOCUMENTS

| 1190948 | 4/1959 | France | 277/205 |
| 708092 | 4/1954 | United Kingdom | 74/501 |

Primary Examiner—Robert S. Ward, Jr.
Attorney, Agent, or Firm—Paul W. Garbo

[57] ABSTRACT

An effective seal against the infiltration of foreign matter into a push-pull remote control is provided by a spring-loaded ring seal disposed in contact with a slidable end rod of the control. The ring seal is formed by a plastic C-shaped channel which holds a metal helical spring. One of the two spring-loaded side walls of the C-shaped channel presses against the cylindrical surface of the end rod and thus impedes the penetration of dust and vapors into the remote control.

8 Claims, 6 Drawing Figures

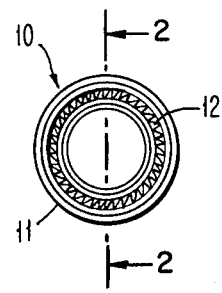
FIG. 1
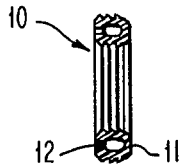
FIG. 2
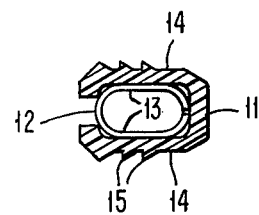
FIG. 3
FIG. 4
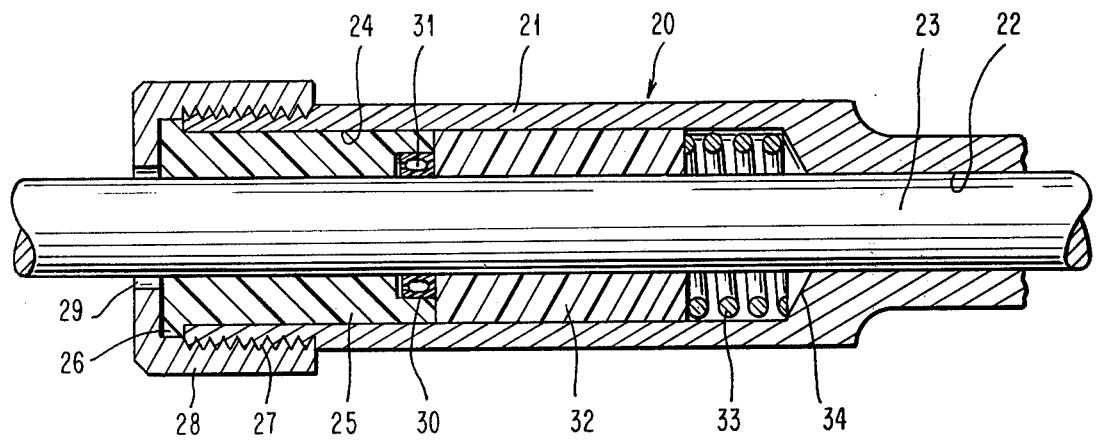

PUSH-PULL CONTROL WITH SPRING-LOADED SEAL

BACKGROUND OF THE INVENTION

This invention relates to improved tubular remote controls of the type having a push-pull element slidable in a tubular sheath, and more particularly, to such controls in which a seal is provided around at least one end of the push-pull element.

Push-pull remote controls fall into two principal types: the wire or cable type and the ball bearing type. An old and familiar wire type control was the Bowden control used to operate the choke from the dashboard of early automobiles. A modern form of the cable type of remote control is shown in U.S. Pat. No. 3,994,185.

U.S. Pat. No. 3,452,615 is illustrative of the ball bearing type of remote control in which a push-pull blade is movable in a tubular sheath while supported by a series of spaced ball bearings disposed in contact with each of the two wider faces of the blade. U.S. Pat. No. 3,464,285 shows a similar remote control in which the movable blade or core is supported between two opposed series of quasi-cylindrical rollers in lieu of ball bearings.

When at least one end of a push-pull remote control is in a dusty or smoky atmosphere, foreign matter such as tar from tobacco smoke slowly infiltrates into the tubular sheath of the control between the end rod and the end fitting of the control. The accumulation of foreign matter in the control is accelerated when one end is exposed to a higher atmospheric pressure than the pressure prevailing at the other end of the control. For example, such a pressure unbalance is encountered in remote controls used on airplanes where one end of the control is within the pressurized body of the airplane and the other end is outside that body. In a period of time, the accumulation of foreign matter in the control can build up to a level which will make movement of the push-pull element difficult and, in some cases, even impossible. This tendency is particularly hazardous in the case of remote controls on airplanes. Even moisture entering a remote control is dangerous because of freezing.

Accordingly, the object of this invention is to provide a ring seal around at least one end rod and within the end fitting of a push-pull remote control to impede the infiltration of foreign matter into the control.

SUMMARY OF THE INVENTION

In accordance with this invention, at least one end rod of a push-pull remote control is provided with a spring-loaded ring seal in the form of a plastic C-shaped channel in which a metal helical spring is seated. One of the two opposed spring-loaded side walls or lips of the plastic ring with the C-shaped cross-section presses against the cylindrical surface of the slidable end rod while the other spring-loaded side wall of the ring seal presses against a stationary cylindrical surface within the end fitting of the remote control.

For a better understanding of the invention, the further description thereof will refer to the accompanying drawings.

BRIEF DESCRIPTION OF THE DRAWINGS

FIG. 1 is a plan view of the preferred type of seal used in this invention;

FIG. 2 is a sectional view of the seal of FIG. 1 taken along the line 2—2;

FIG. 3 is an enlarged view of the cross-section of the seal shown in FIGS. 1 and 2;

FIG. 4 is a longitudinal sectional view of a portion of an end fitting of a push-pull remote control showing schematically a preferred embodiment of the seal of this invention;

DESCRIPTION OF PREFERRED EMBODIMENTS

Figure 5:
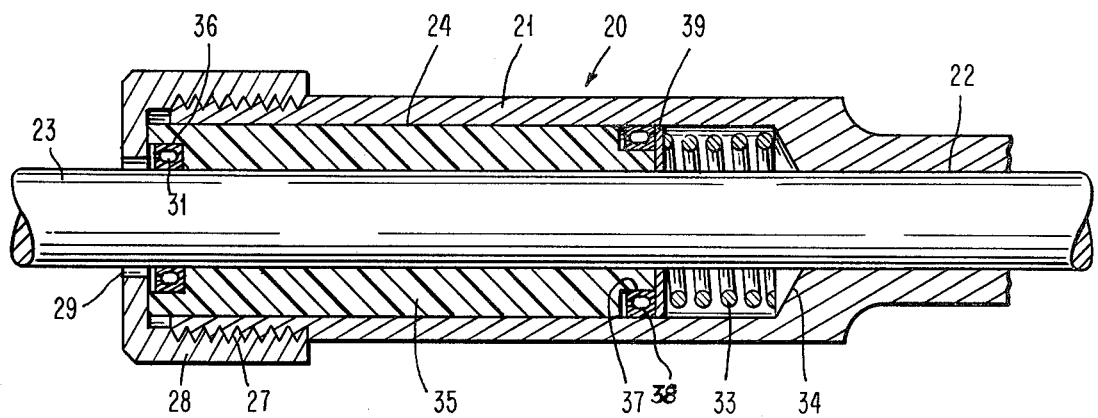
FIG. 5 is a longitudinal sectional view similar to FIG. 4 showing another preferred embodiment of the invention.

The preferred type of seal 10 used in a push-pull remote control in accordance with this invention comprises, as shown in FIGS. 1, 2 and 3, plastic ring 11 having a C-shaped cross-section in which is disposed elliptical metal spring 12 extending throughout the circular groove in C-shaped plastic ring 11. The coils of metal spring 12 are canted so that flattened portions 13 of spring 12 press opposite lips 14 of plastic ring 11 outwardly against the wall or surface at which sealing against fluid leakage is to be effected. To enhance sealing, lips 14 of plastic ring 11 preferably have a plurality of circumferential pointed ridges 15 that ensure intimate contact with the opposed surface at which sealing is to be established. The spring-loaded plastic seal shown in FIGS. 1, 2 and 3 is manufactured by Bal-Seal Engineering Company of Tustin, California. Plastic ring 11 is desirably made of polytetrafluoroethylene or the graphite-filled form of said polymer but in most embodiments of this invention polytetrafluoroethylene is the preferred plastic.

FIG. 4 shows end fitting 20 of a push-pull remote control comprising sleeve 21 having bore 22 through which end rod 23 of the push-pull element extends in slidable contact. Sleeve 21 also has larger bore 24 in which bushing 25 is inserted. Flange 26 of bushing 25 is seated against threaded end 27 of sleeve 21. Cap 28 is screwed on sleeve 21 to capture flange 26 between threaded end 27 and cap 28. Thus, particularly with bushing 25 made of plastic, a seal against fluid leakage between bushing 25 and sleeve 21 is achieved. Cap 28 is provided with central opening 29 through which end rod 23 extends. Heretofore, bushing 25 extended substantially the full length of bore 24 in sleeve 21. However, bushing 25 has failed to prevent air laden with condensible vapors to seep along the interface between end rod 23 and bushing 25 and thus flow into the tubular portion of the remote control.

In accordance with this invention, this deficiency is overcome by placing a spring-loaded plastic ring seal of the type shown in FIGS. 1, 2 and 3 within bushing 25 in contact with end rod 23. For this purpose, bushing 25 is shortened and the end remote from flange 26 is provided with larger bore 30 into which spring-loaded plastic ring seal 31 is fitted. The axial dimension of bore 30 is slightly in excess of the axial dimension of ring seal 31, say about 1/32 inch in excess. To hold ring seal 31 in bore 30 of bushing 25, bushing segment 32 is kept abutted with bushing 25 by metal coil spring 33 disposed between bushing segment 32 and tapered end 34 of bore 24 in sleeve 21. Clearly, the inner lip of ring seal 31 is in pressing contact with slidable end rod 23 and thus provides a seal against the seepage of vapors along the interface between end rod 23 and bushing segment 32.

FIG. 5 shows the same end fitting 20 of FIG. 4 comprising sleeve 21 with bores 22 and 24, end rod 23, and cap 28 with central opening 29 screwed on threaded end 27 of sleeve 21. However, bushings 25 and 32 of FIG. 4 have been replaced in FIG. 5 with bushing 35 which has enlarged bore 36 dimensioned to hold spring-loaded plastic ring seal 31 in pressing contact with end rod 23. The opposite end of bushing 35 has been turned down to a smaller outside diameter to provide central projection 37 dimensioned so that spring-loaded plastic ring seal 38 fits between bore 24 of sleeve 21 and projection 37 on the end of bushing 35. Washer 39 is held by metal coil spring 33 against projection 37 to capture ring seal 38. Spring 33 seated against tapered end 34 of bore 24 presses not only washer 39 against projection 37 but also bushing 35 against cap 28 of sleeve 21. In this embodiment of the invention, seal 31 prevents fluid leakage between end rod 23 and bushing 35, while similar seal 38 prevents leakage between bore 24 and bushing 35. It will be noted that bushing 35 lacks flange 26 of bushing 25 in FIG. 4.

Figure 6:
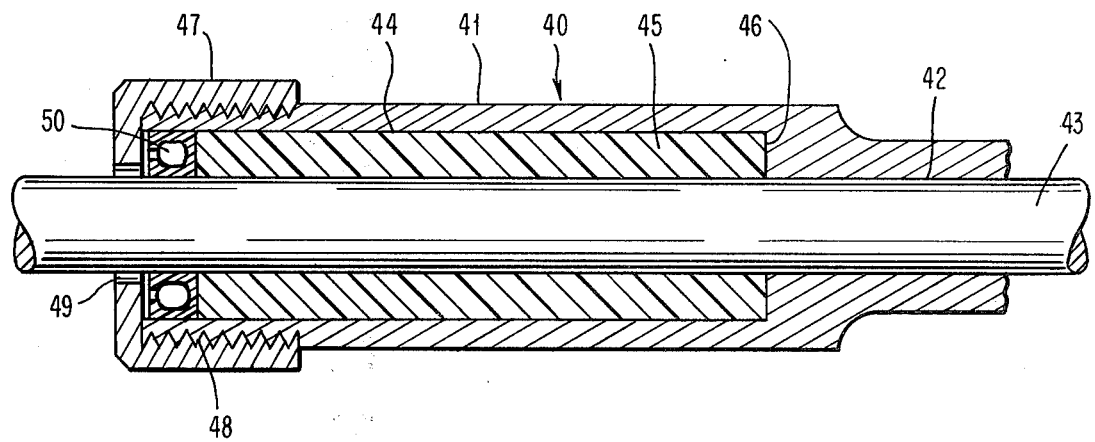
FIG. 6 is a longitudinal sectional view similar to FIGS. 4 and 5 showing still another preferred embodiment of the invention.

End fitting 40 of FIG. 6 comprises cylindrical sleeve 41 having bore 42 in which slidable end rod 43 is positioned and larger bore 44 which holds bushing 45. Bore 44 has flat end 46 against which bushing 45 is abutted. Cap 47 is designed to be screwed onto threaded end 48 of sleeve 41 so that the flat portion of cap 47 is brought tightly against the rim of threaded end 48. End rod 43 extending through bushing 45 passes through central opening 49. In this embodiment of the invention, spring-loaded plastic ring seal 50 has its inner lip in contact with cylindrical end rod 43 and its outer lip in contact with bore 44 of sleeve 41. The length of bushing 45 is fixed so that the axial space between cap 48 and bushing 45 is slightly greater than the axial dimension of ring seal 50. Ring seal 50 serves the dual function of preventing fluid leakage both along the interface of end rod 43 with bushing 45 and along the interface of bushing 45 with bore 44 of sleeve 41.

For maximum protection against the seepage of condensible vapors into the push-pull remote control, spring-loaded plastic ring seals 31, 38 and 50 in FIGS. 4, 5 and 6 are preferably placed with the open side of the C-shaped cross-section (see FIG. 3) of the flexible plastic ring facing the cap on the end fitting. Since the end fitting is usually in a zone of higher pressure, such as the pressurized cabin of an aircraft, than the pressure prevailing outside the aircraft, the higher pressure will help press the opposite lips of the plastic ring against the surfaces along which fluid leakage is to be prevented.

The positioning of the spring-loaded plastic ring seal within the end fitting of a push-pull remote control can be varied considerably. Thus, in FIG. 6, ring seal 50 can be placed against flat end 46 of bore 44 and bushing 45 will then abut cap 47. Likewise, ring seal 50 can be replaced with two ring seals in the manner shown in FIG. 5 so that the ring seal of smaller diameter is adjacent cap 47 while the ring seal of larger diameter is adjacent flat end 46 of bore 44. Of course, another variation of using two ring seals in end fitting 40 of FIG. 6 is to set the ring seal of larger diameter adjacent cap 47 and the ring seal of smaller diameter adjacent flat end 46 of bore 44. In FIG. 5, metal coil spring 33 can be placed against cap 28 and a second washer similar to washer 39 will then be set between spring 33 and the end of bushing 35 which holds ring seal 31.

Still other variations of the invention will be apparent to those skilled in the art without departing from the spirit and scope of the invention which is directed to the prevention of fluid leakage along the cylindrical surface of the end rod emerging from an end fitting of a push-pull remote control. Accordingly, only such limitations should be imposed on the scope of the invention as are set forth in the appended claims.

What is claimed is:

1. In an end fitting of a push-pull remote control wherein the cylindrical end rod of the push-pull element extends therethrough, the improvement of a spring-loaded plastic ring seal disposed within said end fitting, said ring seal comprising a flexible plastic ring having a C-shaped cross-section and a metal coil spring inserted in said C-shaped cross-section and extending circularly throughout said plastic ring to press the two opposite free lips of said C-shaped cross-section apart, said ring seal being disposed with one of said lips in pressing contact with said end rod.

2. The end fitting of claim 1 wherein the ring seal is set in an inner cylindrical recess in a tubular bushing held within said end fitting.

3. The end fitting of claim 2 wherein a second ring seal is set in an outer cylindrical recess in the tubular bushing held within said end fitting.

4. The end fitting of claim 1 wherein the two free lips of the C-shaped cross-section of the plastic ring have a plurality of external circumferential pointed ridges and the open side of said C-shaped cross-section faces the end of said end fitting from which the end rod emerges.

5. In an end fitting of a push-pull remote control wherein the cylindrical end rod of the push-pull element extends through a tubular bushing held within said end fitting, the improvement of a spring-loaded plastic ring seal disposed within said end fitting aligned with the bore in said bushing, said ring seal comprising a flexible plastic ring having a C-shaped cross-section and a metal coil spring inserted in said C-shaped cross-section and extending circularly throughout said plastic ring to press the two opposite free lips of said C-shaped cross-section apart, said ring seal being disposed with one of said lips in pressing contact with said end rod.

6. The end fitting of claim 5 wherein the other lip of the plastic ring is in pressing contact with the tubular bushing.

7. The end fitting of claim 6 wherein a second tubular bushing is held within said end fitting abutted to the end of the tubular bushing where the other lip of the plastic ring is in pressing contact therewith.

8. The end fitting of claim 5 wherein the other lip of the plastic ring is in pressing contact with an inner cylindrical surface of said end fitting.

* * * * *